United States Patent [19]

Petz et al.

[11] Patent Number: 4,785,452
[45] Date of Patent: Nov. 15, 1988

[54] ERROR DETECTION USING VARIABLE FIELD PARITY CHECKING

[75] Inventors: Bruce R. Petz; Richard P. Rieger, both of Rochester; Andrew D. Walls, Albert Lea, all of Minn.

[73] Assignee: International Business Machines Corporation, Armonk, N.Y.

[21] Appl. No.: 855,645

[22] Filed: Apr. 25, 1986

[51] Int. Cl.$^4$ ............................................. G06F 11/00
[52] U.S. Cl. ......................................... 371/38; 371/51
[58] Field of Search ............... 371/37, 49, 38, 50, 371/39, 51, 40, 41, 42; 364/200, 900

[56] References Cited

U.S. PATENT DOCUMENTS

| | | | |
|---|---|---|---|
| 3,873,920 | 3/1975 | Apple | 371/42 |
| 4,071,887 | 1/1978 | Daly | 364/900 |
| 4,450,562 | 5/1984 | Wacyk | 371/51 |
| 4,530,050 | 7/1985 | Fukunaga | 364/200 |
| 4,646,312 | 2/1987 | Goldsbury | 371/37 |
| 4,660,202 | 4/1987 | Woodsum | 371/37 |

*Primary Examiner*—Michael R. Fleming
*Attorney, Agent, or Firm*—Bradley A. Forrest

[57] ABSTRACT

A variable number of parity bits or error correction code per word is used to increase error detection for words having the extra parity bits in a control store. Since some words do not utilize all the architected space available for words, extra parity bits are generated at development time for such words and stored with the words. A decoder identifies the location and number of parity bits. Parity checking against the extra parity bits is then performed on different groups of bits in the word. This provides an inexpensive means of increasing error detection with minimal hardware cost.

15 Claims, 1 Drawing Sheet

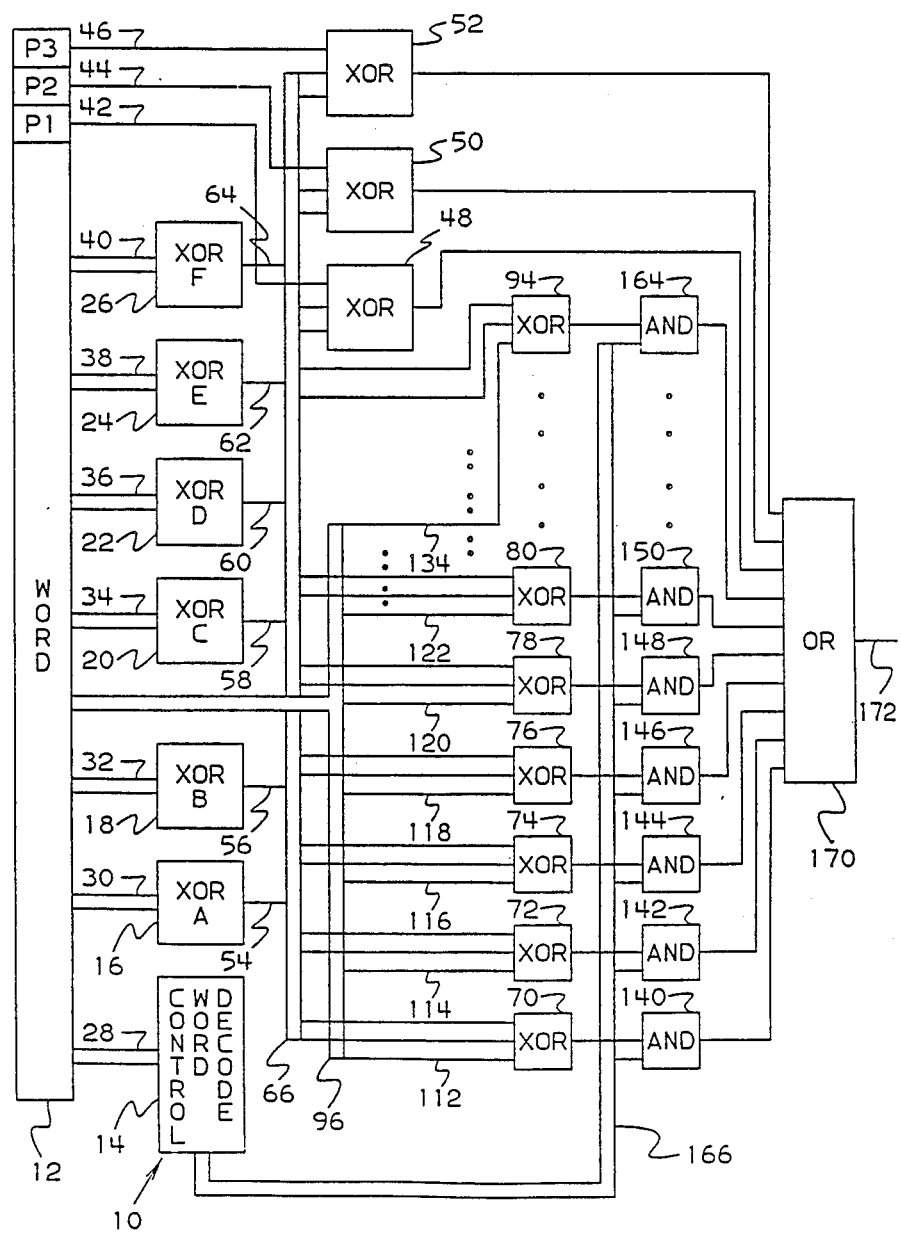

ERROR DETECTION USING VARIABLE FIELD PARITY CHECKING

BACKGROUND OF THE INVENTION

The invention relates to error detection in the representation of words by bits and in particular to the use of a variable number of parity bits associated with the words.

Numerous schemes are available for error checking of words during their storage or transmission. These schemes vary from a fixed number of parity bits associated with the word, to storing the word in more than one location for comparison.

U.S. Pat. No. 4,530,050 to Fukunaga et al. describes variable length instructions that permit operand specifiers to be shared. U.S. Pat. No. 4,450,562 to Wacyk et al, shows a two level parity error correctionsystem with a fixed number of parity bits.

Many times, an instruction word requires less than the architected number of bits to express the word. In such cases, a fixed number of parity bits is used for all the words, regardless of its size. The parity bits permit detection and potentially correction of words dependent on the number of bits. Usually, there are instructions approaching the architected number of bits that serve to limit the number of fixed parity bits used for all the words, thus reducing the number of bits in error that are detectable and/or correctable for all the words.

Instruction words are usually stored in static RAM (random access memory) chips or imbedded arrays which are very fast and permit a processor to run at a fast rate. Such RAMs also have a high failure rate and can severely influence a processor's ability to detect and isolate its own errors. Since the instruction words are not usually altered by the processor, but simply read and executed, parity is generated at development time and stored with the control word, so the parity bits are also subject to the same error rate as the word.

SUMMARY OF THE INVENTION

A variable number of parity bits per word is used to increase error detection and correction for words having the extra parity bits in a control store. Since some words do not utilize all the architected space available, extra parity bits are generated at development time for such words and stored with the words. This provides an inexpensive means of increasing error detection with minimal hardware cost.

In the preferred embodiment, a control word used to directly control hardware comprises 42 bits, numbered 0–41. In addition, three fixed parity bits are used in all the different types of words. The control word comprises six groups of data bits. An Exclusive OR is performed on each group. The results of the Exclusive ORs are used to perform parity checks, with at least three parity checks performed on each word.

Many of the words have extra parity bits dependent upon the type of word it is. These extra bits are used to check the parity of the groups of data bits and various combinations of groups of data bits.

Further, the location of the parity bits is varied from word to word. When a word is decoded, the possible locations of the parity bits is identified. Further identification of the locations is sometimes dependent on the value of bits in parts of the word other than the bits normally used to decode the word. This provides great flexibility in the location of the parity bits.

By using extra parity bits, the probability of detecting an error in a particular word is increased as a function of the number of extra parity bits. There is an 87.5 percent chance of detecting common types of errors with the three fixed parity bits. When three extra parity bits are used, the probability of detecting a failure which affects all the bits in one 9 bit byte rises to about 98.4 percent. The detection probability is even higher with the use of more variable parity bits.

BRIEF DESCRIPTION OF THE DRAWING

The FIGURE is a logic block diagram of a variable field parity error detection circuit constructed in accordance with the present invention.

DETAILED DESCRIPTION OF THE PREFERRED EMBODIMENT

A variable parity error detection circuit is indicated in block diagram form generally at 10 in the FIGURE. A word 12 comprises 42 bits numbered 0–41 plus three fixed parity bits P1, P2, and P3 in locations 42–44. Word 12 in the preferred embodiment comprises a control instruction word which acts directly on computer hardware. It is preferably stored in fast access memory modules, such as static RAMs so as not to hinder the speed of the hardware. The static RAMs are configured as 9 bits per byte and either 1K, 2K or 4K bytes per chip. There may be multiple chips per module. Other types of words such as data containing words and other memory arrangements are clearly within the scope of the invention.

Each word 12 contains bits comprising a decode field which is used by a common control word decode block 14 to determine the type of word 12. Several types of words are used, and the number of parity bits is dependent on the type. For purposes of parity checking, word 12 is logically divided into six groups A–F as indicated in the table 1 below, where the bit positions in each group comprise a row of the table.

TABLE 1

| Group | Bit positions | | | | | | | | |
|---|---|---|---|---|---|---|---|---|---|
| A | 0 | 1 | 2 | 3 | 7 | 9 | 10 | 13 | 18 |
| B | 4 | 5 | 6 | 8 | 12 | 14 | 16 | 17 | 19 |
| C | 11 | 15 | 20 | 21 | 22 | 23 | 24 | 25 | 26 |
| D | 31 | 32 | 33 | 34 | 35 | 36 | 37 | 38 | |
| E | 27 | 28 | 29 | 30 | | | | | |
| F | 39 | 40 | 41 | | | | | | |

Each of the groups A–F are Exclusive Ored (XORed) by respective XOR gates indicated by blocks 16, 18, 20, 22, 24, and 26. Decode block 14, and XOR blocks 16–26 are shown coupled to word 12 by double lines 28, 30, 32, 34, 36, 38, and 40 for simplicity. Their exact connection to bit positions is indicated in Table 1. Other connections can be similarly made.

Fixed parity bits stored at P1, P2, and P3 are communicated by lines 42, 44, and 46 to XOR blocks 48, 50 and 52 respectively to compare the stored parity with the groups of bits from word 12. The groups XORed by blocks 48, 50 and 52 are indicated by the following formulas:

P1 = Group A XOR B XOR C XOR bit 41 of word 12
P2 = Group A XOR B XOR C XOR D XOR F
P3 = Group A XOR B XOR C XOR D XOR E XOR F The results of the XORs performed on groups A–F by XOR blocks 16–26 are provided to XOR blocks 48–52 by lines 54, 56, 58, 60, 62 and 64 to a double line 66 and then through one or more lines from double line 66 to the XOR blocks 48–52 by one or more lines, depending on the number of groups to be XORed. In practice, the connections are individually made between the group XOR blocks and the fixed XOR blocks as represented by the above formulas.

Each module is checked by at least three individual parity checks due to the allocation of bit locations to the modules as indicated in the following Table 2.

TABLE 2

| BIT | b0 | b1 | b2 | b3 | b4 | b5 | b6 | b7 | b8 |
|---|---|---|---|---|---|---|---|---|---|
| module 1 | 0 | 4 | 10 | 16 | 20 | 25 | 34 | 27 | 39 |
| module 2 | 1 | 5 | 13 | 17 | 21 | 26 | 35 | 28 | 40 |
| module 3 | 2 | 6 | 18 | 19 | 22 | 31 | 36 | 29 | 41 |
| module 4 | 3 | 8 | 12 | 11 | 23 | 32 | 37 | 30 | 42 |
| module 5 | 7 | 9 | 14 | 15 | 24 | 33 | 38 | 44 | 43 |

If a module experiences a failure which affects all the bits in one byte, then there exists an $(1-0.5^{**}3)=87.5$ percent chance of detecting the error. However, if there are some spare bits in the control words then those bits are used to hold a parity bit for the group which it belongs to. For example, if bits 13, 14 and 15 are unused for a particular class of control words then they are used to hold parity for groups A, B, and C respectively. Therefore, three additional checks are done by comparing the OR of all bits in groups A and B and C with bits 13, 14 and 15.

Groups A, B, and C span as many modules as possible. When individual groups contain extra parity bits, each module containing a parity bit is checked, making problem determination and isolation more likely. The parity checks using extra parity bits are performed by extra parity XOR blocks 70, 72, 74, 76, 78, 80, . . . and 94. In the preferred embodiment, there are up to 12 extra parity bits in selected locations of word 12. The extra bits are communicated to the extra parity XOR blocks by a double line 96, again using the double line representation to reduce the number of direct lines required to be drawn. Each extra parity XOR block is actually connected directly to a selected bit position of word 12. The exact position of extra parity bits is a function of both the control word characteristics and the underlying hardware which implements the control word. Wherever there are unused bits in a control word, the potential for extra parity bits exists.

Each extra parity XOR block is also coupled to one or more of the results of the group XOR blocks via double line 66. In the above example of three extra parity bits corresponding to groups A, B, and C, the results of XOR 16, XOR 18 and XOR 20 are fed to XOR 70, XOR 72 and XOR 74 for XORing with the extra parity bits communicated from double line 96 over lines 112, 114, and 116 respectively. Further connection from double line 96 to extra parity XORs include lines 118, 120, 122 . . . and 134.

Each extra parity XOR block has an associated enabling device comprising AND blocks 140–164. The enabling AND blocks are enabled by communications from decode 14 on a double line 166, again respresenting multiple individual connections. By decoding the word 12, decode 14 determines the number and locations of extra parity bits in word 12 and enables the appropriate AND block so that the parity check is passed through to an OR block 170 which serves to provide an error indication on a line 172. Fixed parity XOR blocks 48, 50 and 52 are also coupled to OR block 170 for indication by OR block 170 of a fixed parity error.

In the preferred embodiment, the extra parity bits comprise bits P4–P15. Their locations respectively in word 12 and the bit locations to be checked against are indicated in the following Table 3:

TABLE 3

| PARITY | LOCATION | BIT LOCATIONS TO BE XORed |
|---|---|---|
| P4 | 23 | 11,15,20–22,24–26 |
| P5 | 9 | 0–3,7,10,13,18 |
| P6 | 7 | 0–3,9–10,13,18 |
| P7 | 18 | 0–3,7,9–10,13 |
| P8 | 19 | 4–6,8,12,14,16–17 |
| P9 | 20 | 11,15,21–26 |
| P10 | 17 | 4–6,8,12,14,16,19 |
| P11 | 13 | 0–3,7,9–10,18 |
| P12 | 14 | 4–6,8,12,16–17,19 |
| P13 | 15 | 11,20–26 |
| P14 | 6 | 4–5,8,12,14,16–17,19 |
| P15 | 26 | 11,15,20–25 |

The number and identity of the extra parity bits is determined by the control word decode block 14 as a function of both the decode, usually comprising bits 0–4 and subfields contained within word 12. Certain types of words, such as a type word referred to as an operand fetch, have different numbers of extra parity bits dependent on the value of a bit outside the decode. When an operand fetch word has a bit position 34 equal to "0", it is known that extra parity bits P7, P8 and P9 are in use. Similar dependencies exist for other types of words to provide freedom of location for the extra parity bits.

Examples of the subfields include branch, next address, status control and register identifications. In some types of words, fewer registers are required, and extra parity bits may be located in their place. In some words, the value of one field indicates that another field is or is not to be used. This provides space for extra parity bits as a function of the decode and selected subfields.

The use of extra parity bits takes little extra hardware, but depending on the utilization of the control words, it can increase error detection significantly. This method is especially useful for designs where a few classes of control words are predominant and they have spare bits.

For architectures where a multiple bit failure affects only 1 or 2 parity bits, this method significantly increases the detection effectiveness as long as most of the encountered control words contain these variable parity bits. It is often beneficial to increase the detection of control store errors even though it may already be fairly high due to the number of fixed parity checks and their spread across the various memory modules. Since control store is a major contributor to overall processor failure rate, increasing the error detection, even though it is already good, can give a significant increase to overall processor error detection. This in turn lowers the system's field service costs and improves customer satisfaction.

In further embodiments of the invention, some of the extra available parity bits are used to contain parity of bits outside the predetermined groups A–F. Certain other critical groups of bits are XORed and compared to the extra parity bits. Further variants include the group XOR blocks XORing different combinations of groups as do the fixed parity XOR blocks. Several other comparisons are within the scope of the invention.

In one embodiment, the parity bits are used as integrity bits to provide correction information for the word. If enough extra integrity bits are available, well known error correction codes may be stored at the available locations. The control word decode block 14 can determine from the decode in word 12 if such is the case and cause appropriate circuitry to act on the word to provide detection and correction of errors.

To demonstrate the effectiveness of the variable parity error detector, assume that a control word as described above contains three fixed parity bits and three non-function bits which contain parity bits. If module 2 experienced a failure, there is about a 50 percent chance of detecting the error with each of the fixed parity checks. With an additional capability of detecting the error with each of the variable bits, which is 50 percent each, the probability of detecting the error rises to $1-0.5**6=98.4$ percent from 87.5 percent for just the three fixed bits.

While the invention has been described with respect to a preferred embodiment, those skilled in the art will be able to create many other embodiments within the scope of the following claims.

What is claimed is:

1. A parity checker for a memory storing variable length multibit words having a variable number of parity bits, the checker comprising:
   a decoder for decoding the variable length words to identify the parity bits contained therein, and to identify selected bits to which said parity bits correspond; and
   a parity checker coupled to the decoder for checking the parity of the selected bits in said words against the identified parity bits as a function of the variable number of parity bits contained in each word.

2. The parity checker of claim 1 wherein the decoder identifies both fixed parity bits common to all types of words, and extra parity bits dependent upon the types of words.

3. The parity checker of claim 1 wherein the decoder identifies the number and location of parity bits as a function of the type of word containing the parity bits.

4. The parity checker of claim 1 wherein each word comprises a decode field used by the decoder to identify the type of word, and the location of the parity bits.

5. The parity checker of claim 4 wherein each word comprises a plurality of subfields, and the location of at least one parity bit in selected words is identified by the decoder as a function of the bit in value in one or more such subfields.

6. The parity checker of claim 1 wherein the words are stored in a plurality of fast access memory modules, the bits of each word being stored on different modules.

7. The parity checker of claim 6 wherein the bits of words are divided in groups for parity checking purposes, and each module contains at least one bit from one selected group.

8. The parity checker of claim 7 wherein the bits in each group are spread out over the modules such that a failure of one module will affect the parity of more than one group.

9. The parity checker of claim 8 wherein the parity bits comprise both fixed and extra parity bits, and wherein the fixed parity bits correspond to the parity of combinations of groups of bits, and selected extra parity bits correspond to the parity of selected groups.

10. A method of checking parity of multibit words containing parity bits in variable locations, comprising the steps of:
    (a) decoding the words to identify the variable location of at least one parity bit contained therein;
    (b) identifying at least one group of bits in each word based on the decoding;
    (c) generating parity for each at least one group of bits to be parity checked; and
    (d) checking the parity of the at least one group of bits against the corresponding at least one parity bit identified to detect errors in the word.

11. An integrity checker for a memory storing multibit words having a variable number of integrity bits, the checker comprising:
    word decode means for identifying the integrity bits contained in the multibit words;
    second means coupled to the word decode means for identifying selected bits corresponding to each integrity bit identified; and
    integrity checking means coupled to the word decode means and to the seocnd means for checking the integrity of the selected bits in said words against the identified integrity bits as a function of the variable number of integrity bits contained in each word.

12. The integrity checker of claim 11 wherein the integrity bits comprise single bit error correct, double bit error detect error correction code.

13. The integrity checker of claim 12 wherein the multibit words comprise a plurality of different types, and where the location of bits comprising the error correction code is dependent on the type of word.

14. A method of checking integrity of multibit words containing integrity bits in variable locations, comprising the steps of:
    (a) identifying the variable location of the integrity bits contained in a multibit word;
    (b) checking the integrity of the multibit word against the corresponding integrity bits identified; and
    (c) generating an error signal dependent upon said integrity checking.

15. A parity checker for a memory storing various classes of multibit words, the parity checker comprising:
    memory means for storing a multibit word;
    decode means coupled to the memory means for decoding the word to determine the class of the word;
    a first plurality of parity generators, each of which is selectively coupled to bit locations of said memory means for generating parity of the bits stored at the locations to which it is selectively coupled;
    a second plurality of parity checkers, each of which is selectively coupled to single bit locations of the memory means and to at least one of the first plurality of parity generators to receive at least one parity bit therefrom, said secoond plurality of parity checkers generating parity of the bits at the locations to which it is coupled;
    a plurality of logic gates coupled to the decode means wherein different ones of said logic gates are operative dependent on the class of word decoded by said decode means, said logic gates selecting parity from the second plurality of parity checkers; and
    parity error checking means coupled to each of the plurality of logic gates for receiving the selected parity from the operative logic gates to generate an error indication if said parity is incorrect.

* * * * *